United States Patent [19]
Kosuge

[11] Patent Number: 4,470,035
[45] Date of Patent: Sep. 4, 1984

[54] ANALOG FUEL CONSUMPTION SIGNAL GENERATOR FOR VEHICLES

[75] Inventor: Shuichi Kosuge, Nagoya, Japan

[73] Assignee: Nippondenso Co., Ltd., Kariya, Japan

[21] Appl. No.: 305,733

[22] Filed: Sep. 25, 1981

[30] Foreign Application Priority Data

Oct. 2, 1980 [JP] Japan .................................. 55-138139

[51] Int. Cl.³ ............................................ G08B 21/00
[52] U.S. Cl. .................................. 340/52 R; 73/114; 235/61 J; 340/679
[58] Field of Search ............... 340/52 R, 679; 73/114; 235/61 J

[56] References Cited
U.S. PATENT DOCUMENTS 2,454,393 11/1948 Leonard ............................. 340/52 R
4,008,607 2/1977 Ooiwa et al. ......................... 73/114
4,067,232 1/1978 Murray ............................. 340/52 R
4,136,389 1/1979 Vogel ................................. 73/114
4,210,908 7/1980 Sakakibara ........................ 340/52 R
4,354,173 10/1982 Kuhn et al. ....................... 340/52 R Primary Examiner—Glen R. Swann, III
Attorney, Agent, or Firm—Cushman, Darby & Cushman

[57] ABSTRACT

A signal proportional to a vehicle speed is applied to one input terminal of a differential amplifier, and the output of the differential amplifier is fed back to the other input terminal of the differential amplifier via a switch the on-time of which is proportional to consumed fuel. Then, the output of the differential amplifier is taken out as a fuel consumption signal for informing a vehicle driver the momentary fuel consumption of the vehicle on a voltmeter or ammeter.

4 Claims, 3 Drawing Figures

ANALOG FUEL CONSUMPTION SIGNAL GENERATOR FOR VEHICLES

BACKGROUND OF THE INVENTION

This invention relates to an analog fuel consumption signal generator for vehicles for indicating the amount of instantaneous fuel consumption.

It is important for economic driving of a vehicle that the driver may be informed of the instantaneous fuel consumption of a vehicle.

DESCRIPTION OF THE PRIOR ART

The conventional vehicle fuel consumption indicator counts the distance the vehicle ran consuming a constant amount of fuel and generates a digital signal of the counted distance as a fuel consumption.

However, since the conventional indicator finally indicates analog value by a pointer, it requires a complex digital-to-analog (D/A) converter for converting the digital signal to an analog signal.

Moreover, since the time during which a constant amount of fuel is consumed is dependent upon the running condition of vehicle, the period of time required for an indication is different for each new indication. Furthermore, the conventional indicator generally needs the results of dividing the vehicle speed by the amount of fuel consumption per unit time, and therefore the circuit arrangement thereof is complicated by various restrictions.

SUMMARY OF THE INVENTION

It is an object of the invention to provide an analog fuel consumption signal generator for a vehicle for easily indicating the amount of instantaneous fuel consumption of a vehicle and informing the driver of the instantaneous fuel consumption of a vehicle by applying a signal proportional to vehicle speed to one input terminal of a differential amplifier, feeding the output of the differential amplifier back to the other input terminal of the differential amplifier via a switch the on-time of which is proportional to the consumed fuel, and using the output of the differential amplifier as a fuel consumption signal.

DESCRIPTION OF THE PREFERRED EMBODIMENTS

The present invention will now be explained with reference to the preferred embodiments in conjunction with the accompanying drawings.

Figure 1:
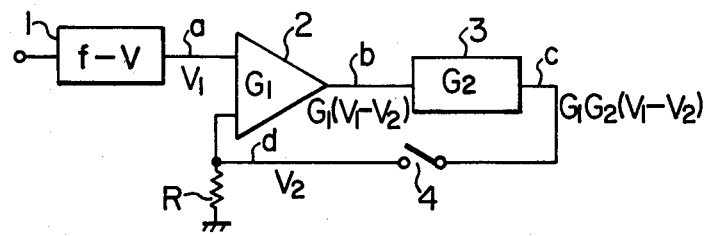
FIG. 1 is a basic diagram of the analog fuel consumption signal generator according to this invention.

Referring to FIG. 1, there is shown a frequency-to-voltage (f-V) converter 1 for converting the frequency of a vehicle speed pulse to an analog voltage. This converter 1 generates at a point a a voltage $V_1$ proportional to the vehicle speed, v, that is, $V_1 \propto v$. Shown at 2 is a differential amplifier, which produces at a point b a voltage of $G_1(V_1-V_2)$, where $V_2$ is the voltage at a point d and $G_1$ the gain. Shown at 3 is a constant current circuit which produces a current proportional to the voltage at point b and has trans conductance of $G_2$.

Shown at 4 is a switch the on-period $T_{ON}$ of which is proportional to the consumption of fuel per unit time. R represents a grounded resistor. The current at point c is given by $G_1 G_2 (V_1-V_2)$ when the voltages at points a and d are $V_1$ and $V_2$, respectively. The current Id at point d is given by $$Id = \frac{V_2}{R} = T_{ON} G_1 G_2 (V_1 - V_2) \tag{1}$$

Following Eq. (2) is derived from Eq. (1)

$$G_1(V_1 - V_2) = \frac{\frac{G_1}{R}}{T_{ON} G_1 G_2 + \frac{1}{R}} V_1 \tag{2}$$

If, now, the condition of $$T_{ON} G_1 G_1 >> \frac{1}{R} \tag{3}$$

is satisfied, Eq. (2) can be approximated to $$G_1(V_1 - V_2) = \frac{\frac{1}{R}}{T_{ON} G_2} V_1 \propto \frac{v}{T_{ON}} \tag{4}$$

because the 1/R in Eq. (2) can be neglected. In other words, the potential at point b corresponds to the fuel consumption.

Figure 2:
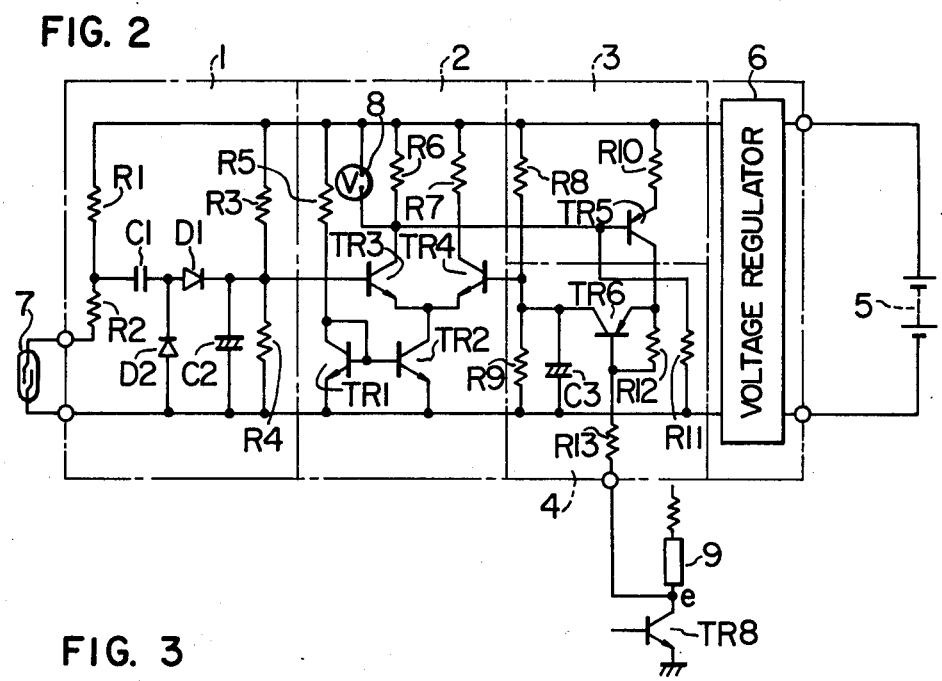
FIG. 2 is an electrical circuit diagram of one embodiment of the invention.

FIG. 2 is a circuit diagram of one embodiment of the analog consumption signal generator for a vehicle having a electronic fuel injection system according to the invention.

In FIG. 2, the voltage 12 V of a power supply 5 is regulated to 6 V by a voltage regulator 6. Shown at 7 is a reed switch for generating a vehicle speed pulse. This reed switch 7 is turned on and off by a rotary-type permanent magnet (not shown) mounted on a meter cable in accordance with the speed of a vehicle thereby to detect the vehicle speed. The amount of fuel consumed is detected from a signal of the valve opening time of a fuel injector at the junction e between the injector coil 9 of the fuel injection system and a transistor TR8 for driving the injector.

The vehicle speed signal from the reed switch 7 is converted from frequency to the analog voltage by the simple frequency-to-voltage converter 1 formed of resistors $R_1$ and $R_2$, capacitors $C_1$ and $C_2$ and diodes $D_1$ and $D_2$. The voltage from the output of the converter 1 is applied to the differential amplifier 2 formed of transistors $TR_1$ to $TR_4$ and resistors $R_5$ to $R_7$. The output of the differential amplifier 2 is converted to a current by the constant current circuit 3 formed of a resistor $R_{10}$ and a transistor $TR_5$. The output current from the constant current circuit 3 charges a smoothing capacitor $C_3$ via a transistor $TR_6$ of the switch 4 during the injection time. The voltage across the smoothing capacitor $C_3$ is applied to the base of the transistor $TR_4$ as one input terminal of the differential amplifier 2. As a result of this feedback, the differential amplifier 2 produces the base-ground voltage of the transistor $TR_3$ divided by the on-time of the transistor $TR_6$. Thus, a voltmeter 8 connected in the differential amplifier 2 indicates the fuel consumption of a vehicle. In this case, the unit of fuel consumption is 1 km/l or 1 mile/gallon.

Table 1 lists the constants of the circuit elements. The resisters $R_3$, $R_8$ and $R_{11}$ are used for biasing the transistors $TR_3$, $TR_4$ and $TR_5$, respectively.

TABLE 1

| | |
|---|---|
| $TR_1$ to $TR_4$ = 2SC458 | $R_3, R_8$ = 360 kΩ |
| $TR_5, TR_6$ = 2SA733 | $R_4, R_9$ = 3.9 kΩ |
| $D_1, D_2$ = 1S1588 | $R_5$ = 3 kΩ |
| $C_1$ = 0.1 μF | $R_6, R_7$ = 1 kΩ |
| $C_2$ = 47 μF | $R_{10}$ = 5.1 kΩ |
| $C_3$ = 22 μF | $R_{11}$ = 15 kΩ |
| $R_1$ = 3.9 kΩ | $R_{12,13}$ = 100 kΩ |
| $R_2$ = 100 Ω | |

The operation of the analog fuel consumption signal generator for a vehicle according to this invention will be explained.

In FIG. 2, while a vehicle with such a generator is running, the reed switch 7 thereof repeats turning-on-and-off operation at the rate of 4×637 times/60 km/h. During on-operation of the reed switch 7, the capacitor $C_1$ discharges and during off-operation thereof, the capacitor $C_2$ is charged via the diode $D_1$. During one off-operation of the reed switch 7, the electricity charged to the capacitor $C_1$ is moved and the capacitor $C_2$ discharges via the resistor $R_4$ to reach an equilibrium state in which it is charged to a voltage proportional to the vehicle speed.

The transistors $TR_1$ and $TR_2$ serve as a current mirror circuit for supplying a constant current to the emitters of the transistors $TR_3$ and $TR_4$.

The transistors $TR_3$ and $TR_4$ serve as a differettial amplifier for amplifying the voltage difference between the capacitors $C_2$ and $C_3$ so that an amplified voltage difference is produced across the resistor $R_6$. The transistor $TR_5$ which receives this amplified voltage difference at the base provides an electric current proportional to the amplified voltage difference through the collector thereof so that the capacitor $C_3$ is charged by the electric current when the transistor $TR_6$ is rendered conductive.

In the electronic fuel injection system employed in this invention, the injection time is proportional to the fuel consumption. During the fuel injection, the transistor $TR_8$ for driving the injector is turned on, and the transistor $TR_6$ is similarly conducting. Thus, the on-time $T_{ON}$ of the transistor $TR_6$ becomes proportional to the fuel consumption.

The voltage across the resistor $R_6$ as the output of the differential amplifier 2 can be detected by the voltmeter 8, and the scale is proportional to the fuel consumption.

Figure 3:
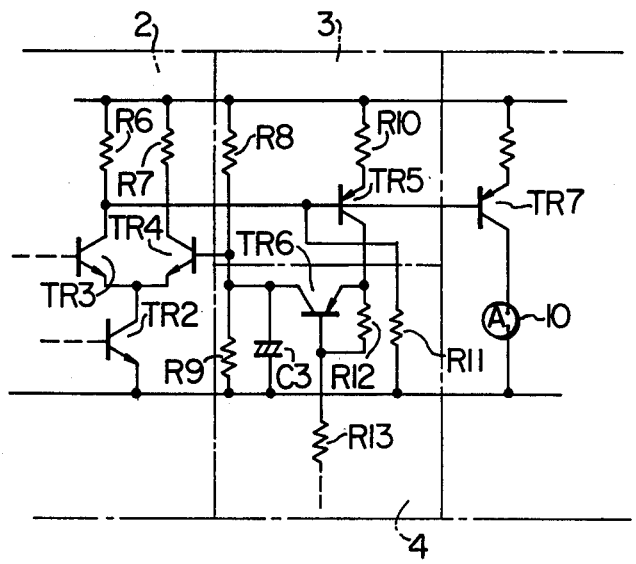
FIG. 3 is an electrical circuit diagram of another embodiment of the invention.

FIG. 3 shows another embodiment of the analog fuel consumption signal generator for vehicle according to this invention. Referring to FIG. 3, there are shown a transistor amplifier $TR_7$ provided in the constant current circuit which is formed of the transistor $TR_5$ and the resistor $R_{10}$ and an indicator 10 such as an ammeter connected to the collector of the transistor $TR_7$. The operation of the embodiment of FIG. 3 is the same as that of the embodiment of FIG. 2 except that the fuel consumption of the vehicle is indicated by the ammeter 10 not by the voltmeter 8 as shown in FIG. 2, and thus will not be described.

While discrete components are used in the embodiments of the invention as shown in FIGS. 2 and 3, operational amplifiers may be employed as the frequency-voltage (f-V) converter 1 and the differential amplifier 2.

In addition, for detection of vehicle speed, a Hall effect element or a photointerrupter can be used in place of the reed switch 7.

In accordance with this invention, the voltage proportional to the fuel consumption can be produced at the output end of the differential amplifier by applying a voltage proportional to the vehicle speed to one input terminal of the differential amplifier, converting the output voltage of the differential amplifier to a current and feeding the current back to the other input terminal of the differential amplifier in proportion to the fuel consumption rate. Therefore, the fuel consumption can easily be detected every moment by a voltmeter or the like.

I claim:

1. An analog fuel consumption signal generator for vehicles comprising:
   a vehicle speed detecting means for generating a pulse signal in proportion to vehicle speed;
   a frequency-to-voltage converter connected to said vehicle speed detecting means to convert the frequency of the pulse signal to an analog voltage;
   a differential amplifier connected to the frequency-to-voltage converter so that the analog signal proportional to the vehicle speed is applied to one input terminal of the differential amplifier and the output of the differential amplifier is applied via a switch, the closing time of which is proportional to consumed fuel, to the other input terminal; and
   a means supplied with the output of the differential amplifier as a fuel consumption signal to indicate the fuel consumption.

2. An analog fuel consumption signal generator for vehicles comprising:
   a vehicle speed detecting means for generating a pulse signal in proportion to vehicle speed;
   a frequency-to-voltage converter connected to the vehicle speed detecting means to convert the frequency of the pulse signal to an analog voltage;
   a differential amplifier connected to the frequency-voltage converter so that the analog voltage proportional to the vehicle speed is applied to one input terminal of the differential amplifier and the output of the differential amplifier is fed back to the other input terminal via a switch the on-time of which is proportional to consumed fuel;
   a means supplied with the output of the differential amplifier as a fuel consumption signal to indicate fuel consumption;
   a constant current circuit connected between the differential amplifier and the switch to convert the output voltage of the differential amplifier to a current proportional to the output of the difference amplifier; and
   an electronic fuel injection system connected to the switch to close the same when fuel is injected.

3. An analog fuel consumption signal generator for vehicles according to claim 2, wherein said electronic fuel injection system includes an injector coil and an injector driving transistor and the fuel injection is detected from a valve opening time signal of the injector.

4. An analog fuel consumption signal generator for vehicles comprising:
   a vehicle speed detecting means for generating a signal in proportion to vehicle speed;
   fuel detecting means for generating a signal in proportion to the amount of fuel consumed;

an on-off fuel detecting means for switching on and off in response thereto, the on-period of which is proportional to the amount of fuel consumed; and
a differential amplifier which includes two input terminals and one output terminal, an output signal from said output terminal being applied to said on-off switching means, and said vehicle speed signal being input to one of said input terminals and said signal applied to said on-off switching means being applied to the other of said input terminals, whereby a fuel consumption signal is output from said output terminal.

* * * * *